US011563807B2

(12) United States Patent
Vokaliga et al.

(10) Patent No.: US 11,563,807 B2
(45) Date of Patent: Jan. 24, 2023

(54) FULLY ORCHESTRATED SETUP OF A CONTAINERIZED CLOUD COMMUNICATION SYSTEM WITHIN AN EMBEDDED OPERATING SYSTEM

(71) Applicant: EMC IP HOLDING COMPANY LLC, Hopkinton, MA (US)

(72) Inventors: Deepak Vokaliga, Hopkinton, MA (US); Francisco Aquino, Marlborough, MA (US); Warren Fleury, Ballincollig (IE); Kenneth Byrne, Knockraha (IE)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/033,813

(22) Filed: Sep. 27, 2020

(65) Prior Publication Data

US 2022/0103627 A1    Mar. 31, 2022

(51) Int. Cl.
| | |
|---|---|
| *H04L 67/1097* | (2022.01) |
| *G06F 3/0482* | (2013.01) |
| *H04L 9/40* | (2022.01) |
| *H04W 12/00* | (2021.01) |
| *H04L 61/4511* | (2022.01) |
| *H04L 67/1001* | (2022.01) |
| *G06F 21/80* | (2013.01) |

(52) U.S. Cl.
CPC ........ *H04L 67/1097* (2013.01); *G06F 3/0482* (2013.01); *H04L 61/4511* (2022.05); *H04L 63/083* (2013.01); *H04L 63/0823* (2013.01); *H04L 67/1001* (2022.05); *H04W 12/009* (2019.01); *G06F 21/805* (2013.01)

(58) Field of Classification Search
CPC ............. H04L 67/1097; H04L 63/0823; H04L 67/1002; H04L 61/1511; H04L 63/083; G06F 3/0482
USPC ......................................................... 709/223
See application file for complete search history.

(56) References Cited

U.S. PATENT DOCUMENTS

| | | | |
|---|---|---|---|
| 7,664,839 B1 * | 2/2010 | Karr ...................... | G06F 3/0604 709/223 |
| 9,697,226 B1 * | 7/2017 | Youngworth ......... | G06F 3/0607 |
| 9,769,213 B1 * | 9/2017 | Madisetti .............. | H04L 63/102 |
| 9,935,772 B1 * | 4/2018 | Madisetti .............. | H04L 9/0819 |
| 10,616,127 B1 * | 4/2020 | Suit ....................... | G06F 9/5088 |

(Continued)

*Primary Examiner* — Thuong Nguyen
(74) *Attorney, Agent, or Firm* — Anderson Gorecki LLP

(57) ABSTRACT

A storage system management application contains control logic configured to enable the storage system management application to fully orchestrate setup of a containerized cloud communication system within embedded operating system, with minimal interaction from an end user. Upon receipt of an instruction to initiate cloud access, the storage system management application enrolls a cloud tethering subsystem and establishes a secure communication channel to the cloud tethering subsystem. The storage system management application also creates a cloud protection environment within the operating system for use by the cloud tethering subsystem, and registers the storage system to the cloud tethering subsystem. The storage system management application also creates external network interfaces on the cloud tethering subsystem and configures one or more private cloud provider endpoints on the cloud tethering subsystem.

19 Claims, 14 Drawing Sheets

(56) References Cited

U.S. PATENT DOCUMENTS

| | | | | |
|---|---|---|---|---|
| 2004/0143642 | A1* | 7/2004 | Beckmann | G06F 15/167 709/213 |
| 2010/0199042 | A1* | 8/2010 | Bates | H04L 9/0891 711/114 |
| 2014/0108474 | A1* | 4/2014 | David | H04L 67/568 707/827 |
| 2014/0164515 | A1* | 6/2014 | Maltbie | H04L 67/108 709/204 |
| 2015/0006846 | A1* | 1/2015 | Youngworth | G06F 3/0619 711/216 |
| 2015/0178724 | A1* | 6/2015 | Ngo | G06Q 20/327 705/71 |
| 2017/0257432 | A1* | 9/2017 | Fu | H04L 67/34 |
| 2018/0077537 | A1* | 3/2018 | Zhou | G01S 5/0221 |
| 2018/0091500 | A1* | 3/2018 | Baty | H04W 12/35 |
| 2018/0232937 | A1* | 8/2018 | Moyer | A63F 13/65 |
| 2018/0336220 | A1* | 11/2018 | Hrebicek | H04L 67/1095 |
| 2020/0092103 | A1* | 3/2020 | Zavertnik | H04L 9/0897 |
| 2020/0125404 | A1* | 4/2020 | Klein | G06F 9/54 |
| 2020/0177589 | A1* | 6/2020 | Mangalvedkar | H04L 67/12 |
| 2020/0327371 | A1* | 10/2020 | Sharma | G06N 5/04 |
| 2021/0019195 | A1* | 1/2021 | Aronov | G06F 9/5077 |
| 2021/0133079 | A1* | 5/2021 | Kannan | G06F 11/3476 |
| 2021/0176641 | A1* | 6/2021 | Angelsmark | H04W 4/80 |

* cited by examiner

FULLY ORCHESTRATED SETUP OF A CONTAINERIZED CLOUD COMMUNICATION SYSTEM WITHIN AN EMBEDDED OPERATING SYSTEM

FIELD

This disclosure relates to computing systems and related devices and methods, and, more particularly, to a fully orchestrated setup of a containerized cloud communication system within an embedded operating system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A storage system management application contains control logic configured to enable the storage system management application to fully orchestrate setup of a containerized cloud communication system within embedded operating system, with minimal interaction from an end user. Upon receipt of an instruction to initiate cloud access, the storage system management application enrolls a cloud tethering subsystem and establishes a secure communication channel to the cloud tethering subsystem. The storage system management application also creates a cloud protection environment within the operating system for use by the cloud tethering subsystem, and registers the storage system to the cloud tethering subsystem. The storage system management application also creates external network interfaces on the cloud tethering subsystem and configures one or more private cloud provider endpoints on the cloud tethering subsystem. By implementing this fully orchestrated process with minimal user input, it is possible to easily integrate access to cloud resources by the storage system, thus greatly increasing the storage system's ability to access storage resources.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
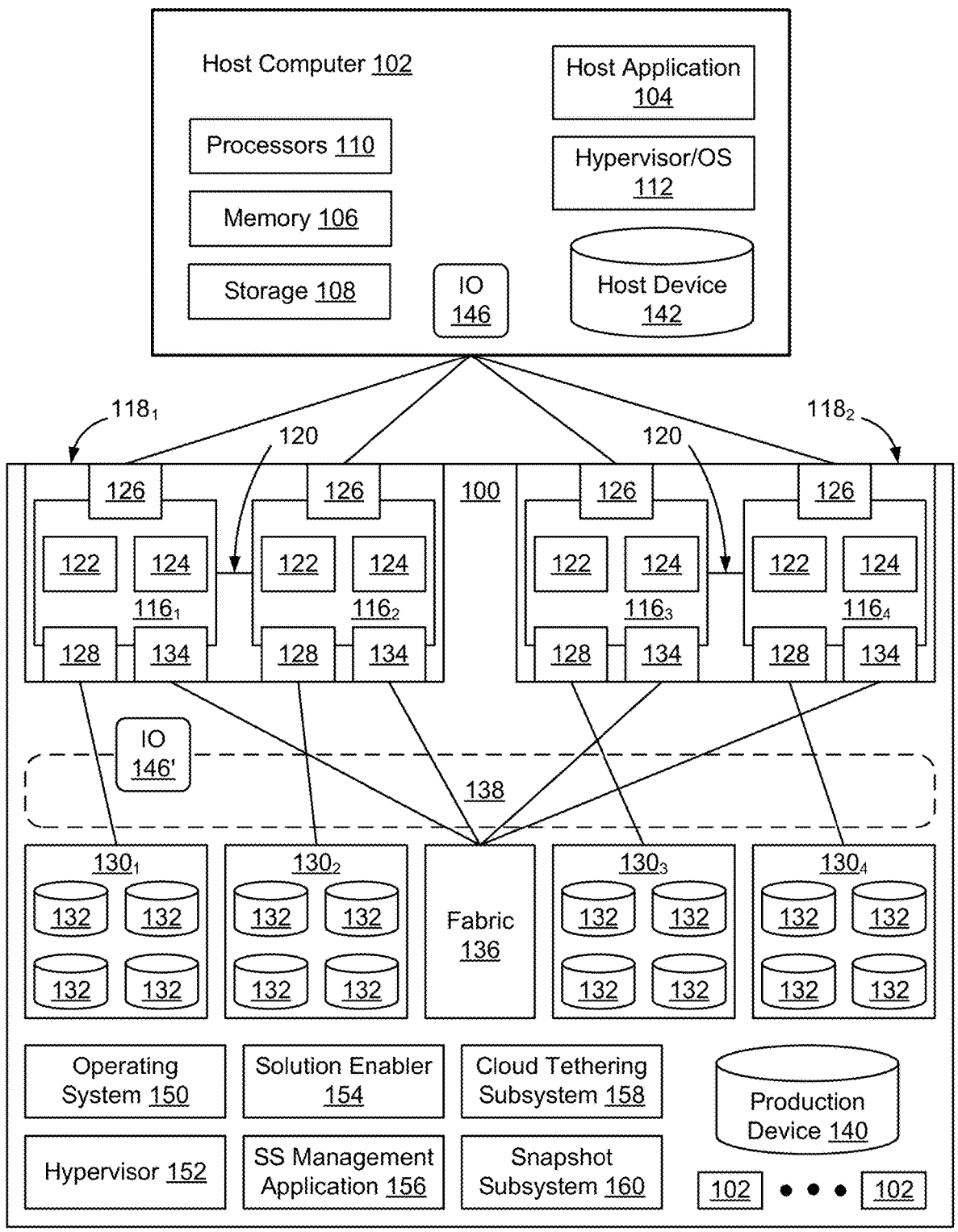
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System)

112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140 (zoning).

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. For example, to protect the production device 140 against loss of data, a snapshot (point in time) copy of the production device 140 may be created and maintained by the storage system 100. If the host computer 104 needs to obtain access to the snapshot copy, for example for data recovery, the snapshot copy may be linked to a logical storage volume (Tdev) and presented to the host computer 104 as a host device 142. The host computer 102 can then execute read/write IOs on the Tdev to access the data of the snapshot copy.

As shown in FIG. 1, in some embodiments the storage system 100 has an operating system 150, and one or more system applications. Example system applications shown in FIG. 1 include a hypervisor 152, a solution enabler 154, a storage system management application 156, a cloud tethering subsystem 158, and a snapshot subsystem 160. Each of these components is described in greater detail below. The interrelationship between several of these components is also shown in greater detail in FIG. 2.

Figure 2:
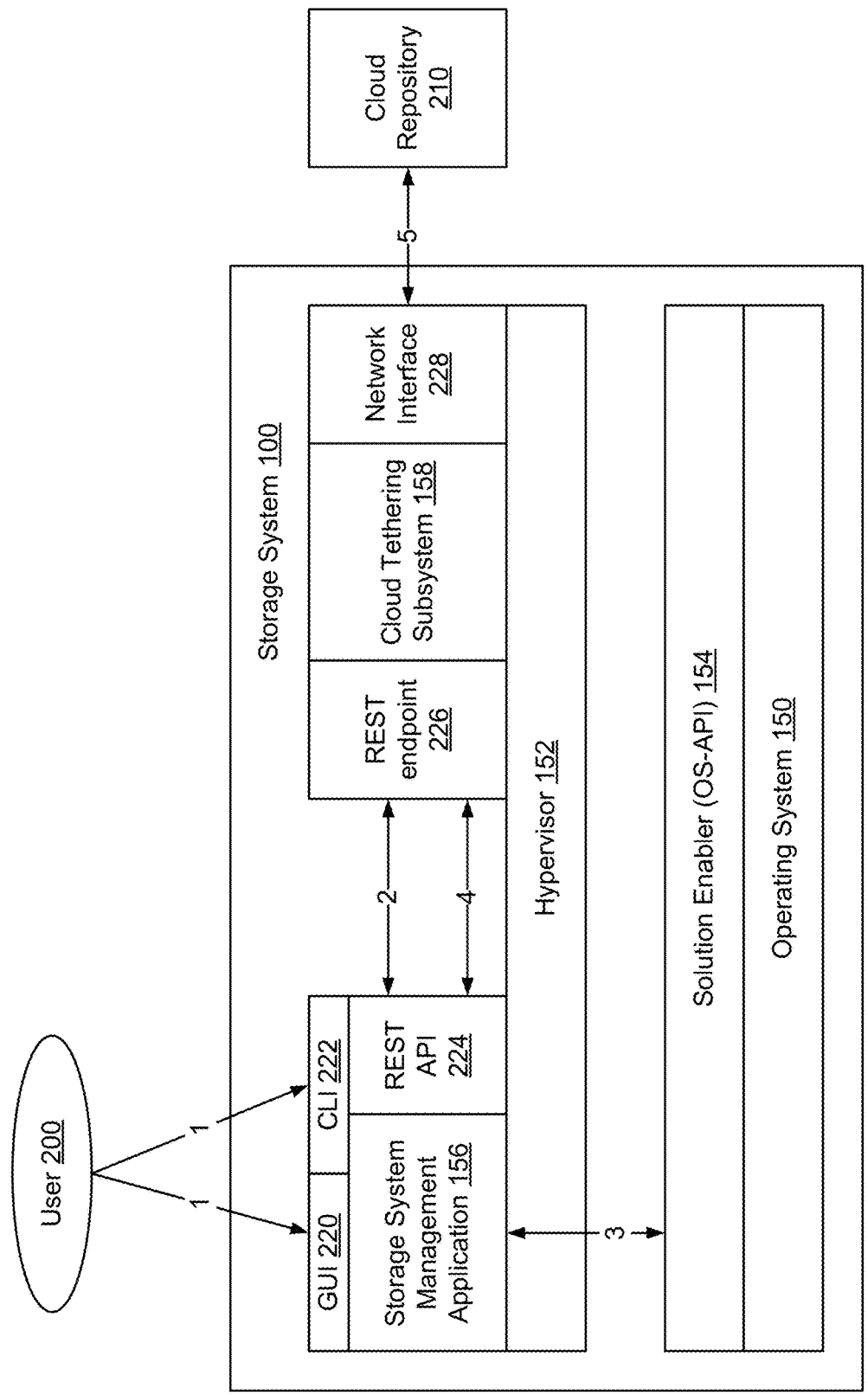
FIG. 2 is a functional block diagram of a storage system connected to a cloud repository, showing the aspects of the storage system configured to enable file systems to be sent to a cloud repository, according to some embodiments.

On some embodiments, operating system 150 is an embedded operating system of the storage system 100. An example operating system 150 may be based on Linux, although other operating systems may also be used. As shown in FIG. 2, hypervisor 152 is used to abstract the physical resources of the storage system, to enable at least some of the system applications to execute in emulations (e.g. virtual machines) on the storage system.

As shown in FIG. 2, solution enabler 154, in some embodiments, is an operating system utility configured to interact with the operating system to adjust operation of the storage system. Solution enabler 154, in some embodiments, acts as a middle layer between operating system 150 and the storage system management application 158 to enable the storage system management application to create environments on the storage system 100, create storage groups, and perform multiple other operations. Some example relevant operations implemented by the solution enabler 154 are discussed in greater detail below. In some embodiments, the solution enabler provides an API layer to the operating system 150, and accordingly is also referred to herein as an OS-API (Operating System Application Programing Interface).

The storage system management application 156 is an application executing in a container in the storage system 100. An example storage system management application is Unisphere™ although many other storage system management applications exist and can be used depending on the implementation. User 200 interacts with the storage system management application 156 via a GUI (Graphical User Interface) 220 or through a command line interface 222, and uses the storage system management application 156 to configure operation of the storage system 100. Of importance to this disclosure, in some embodiments the storage system management application 156 includes control logic configured to fully orchestrate the process of setting up a containerized cloud communication system in the embedded operating system 150, to automatically configure the requisite components of the storage system 100 to enable access to cloud repository 210.

The cloud tethering subsystem 158 is responsible for managing transmission of snapshots and other volumes of data from the storage system 100 to the cloud repository 210 over network interfaces 228. For example, it may be desirable to move at least some of the snapshot copies created by snapshot subsystem 160 from the storage system 100 to a cloud repository 210, for example to free up space in the back-end drive arrays 130, or for many other reasons. In some embodiments, if access to the cloud repository 210 is desired, the storage system management application causes an instance of cloud tethering subsystem to be created on the storage system 100, and then orchestrates interconnecting the cloud tethering subsystem with the storage system, cloud repository, etc., as discussed in greater detail below. In some embodiments, the cloud tethering subsystem 158 is implemented as an application executing in a container in an emulation on storage system 100. A given storage system may have multiple instances of cloud tethering subsystems instantiated thereon at any given point in time.

As shown in FIG. 2, in some embodiments the storage system management application 156 has a Representational State Transfer (REST) Application Programming Interface (API) 224 that it uses to communicate with public REST and private REST endpoints 226 on the cloud tethering subsystem 158. Other ways of communicating between the storage system management application 156 and cloud tethering subsystem 158 may be implemented as well.

As noted above, the cloud tethering subsystem 158, in some embodiments, is used to move snapshots of filesystems to cloud repository 210. Snapshot subsystem 160, in some embodiments, is configured to create these "snapshots". A "snapshot," as that term is used herein, is a copy of a volume of data as that volume existed at a particular point in time. A snapshot of a production device 140, accordingly, is a copy of the data stored on the production device 140 as the data existed at the point in time when the snapshot was created. A snapshot can be either target-less (not linked to a TDev) or may be linked to a target TDev when created. When a snapshot of a production volume is created, the snapshot may include all of the data of the production volume, or only the changes to the production volume that have occurred since the previous snapshot was taken.

In some embodiments, a user 200 will set policies on a group of LUNs referred to as a storage group. These policies define the frequency of the snapshot, the retention period of the snapshots, and optionally a cloud provider where the snapshots are to be stored. The frequency tells the snapshot subsystem 160 in the storage array 130 to create a snapshot against all the LUNs in a storage group at a regular cadence, as defined by the user 200. The sets of snapshots taken against a storage group are referred to as snapsets. The retention period defines the age of the snapshot when it should be deleted. If a cloud provider is specified, this parameter tells the storage array the identity of the cloud-based object repository 210 where the snapshots need to be shipped.

In connection with transmitting a snapshot to a cloud repository, a TDev is linked to the snapshot, and presented in the container of the cloud tethering subsystem 158 as a host device 142. The cloud tethering subsystem 158 then issues read operations on the snapshot, and sends the data to the cloud repository 210. To access storage resources of the storage system 100, the cloud tethering subsystem 158 issues read and write IO operations 146, which are received by front end adapter 126 of the storage system, and processed by the front-end adapter 126.

The cloud tethering subsystem 158 is the primary data mover that is responsible for moving IO traffic between the back-end drive array 130 in the storage system 100 and the remote cloud repository 210. For example, the cloud tethering subsystem 158 is responsible for handling the shipping and restoring snapshots to and from the cloud repository 210. Accordingly, the health and environment of the cloud tethering subsystem 158 is important to enable access of this feature.

Unfortunately, just providing a container with this feature is not enough to enable access to the cloud repository. Specifically, since the container is part of the storage system's embedded operating system, the cloud tethering subsystem needs to be conditioned to work in this environment without breaking the storage system's operating system 150 boundaries.

For example, if a user decides to start to move volumes of data from the storage system 100 to the cloud repository 210, an instance of the cloud tethering subsystem 158 will need to be instantiated in an emulation of the storage system 100. Once created, the cloud tethering subsystem 158 will need to be linked to the storage system management application 156. The cloud tethering subsystem 158 will also need to be configured on the storage system 100, the required cloud protection environment in the storage system operating system will need to be created, network interfaces will need to be created on the cloud tethering subsystem, and connections between the cloud tethering subsystem and the cloud provider will need to be established. Each of these steps can involve a complicated series of interactions between the components shown in FIG. 2. Accordingly, it would be advantageous to provide a system that fully orchestrates the process of setting up a containerized cloud communication system in the storage system's embedded operating system.

Figure 3:
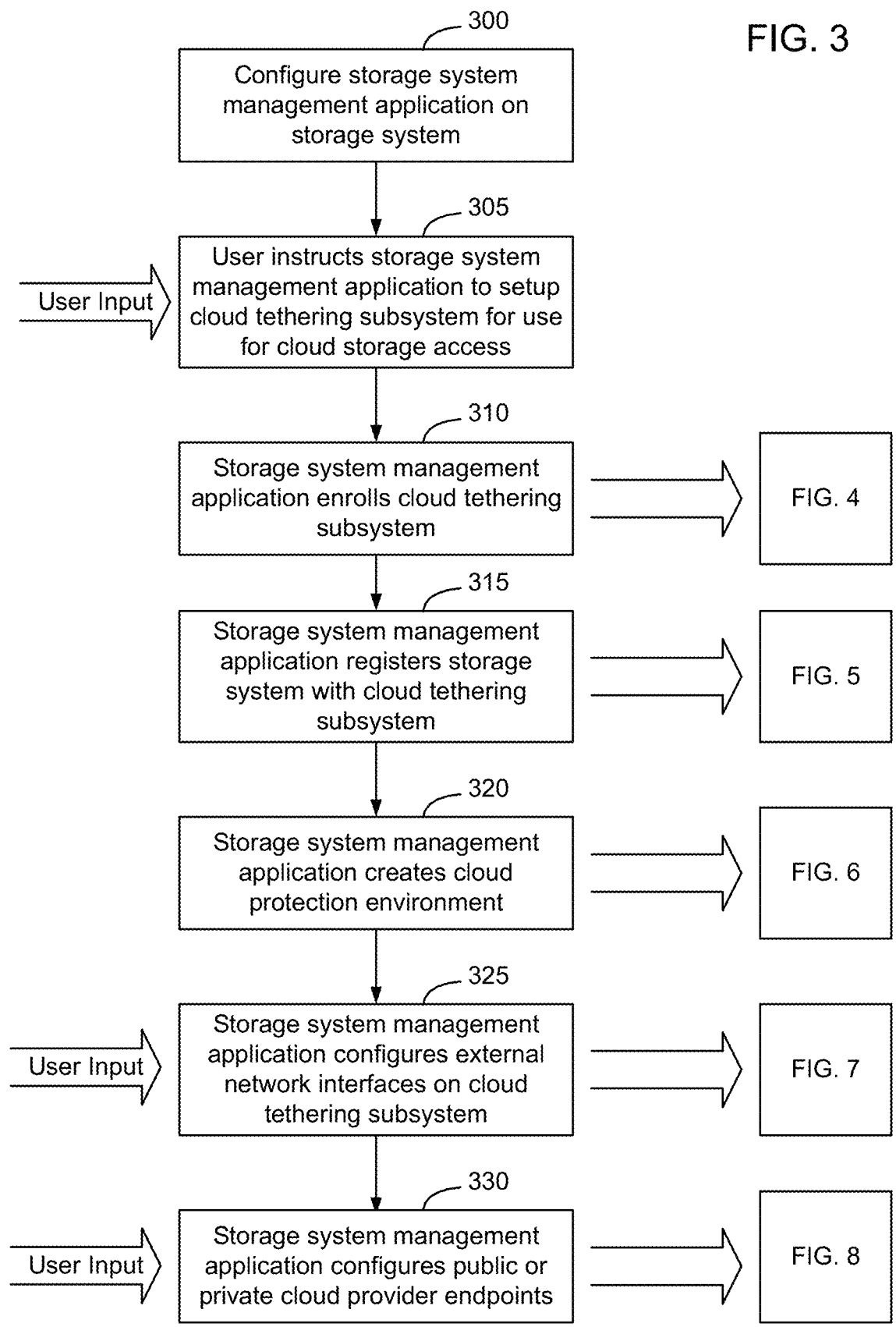
FIG. 3 is a flow chart of an example method of implementing a fully orchestrated setup of a containerized cloud communication system within an embedded operating system, according to some embodiments.

FIGS. 3-8 show an example fully orchestrated process of setting up a containerized cloud communication system in the storage system's embedded operating system, according to some embodiments. FIG. 3 shows an overview of the fully orchestrated process, and shows the points during the process where user input is requested/required. FIGS. 4-8 provide additional details of several of the steps of FIG. 3.

In FIG. 3, it is assumed that the storage system management application 156 has been configured and is instantiated and operational on the storage system 100 (block 300). Accordingly, at block 305, the user 200 provides user input to instruct the storage system management application 156 to setup cloud tethering subsystem 158 for use for access to cloud storage (block 305). In some embodiments, the user input is implemented by selecting (clicking or touching) a "setup" button on the GUI 220. Alternatively, the user input may be implemented using a REST API call to CLI 222. Importantly, the user input at this stage is simply a request that cloud access be enabled. Once the storage system management application 156 receives the request, the user is not involved in the process of creating the cloud tethering subsystem or any of the other processes of establishing the requisite interconnections to enable the cloud tethering subsystem to be configured to operate on the storage system 100.

Figure 4:
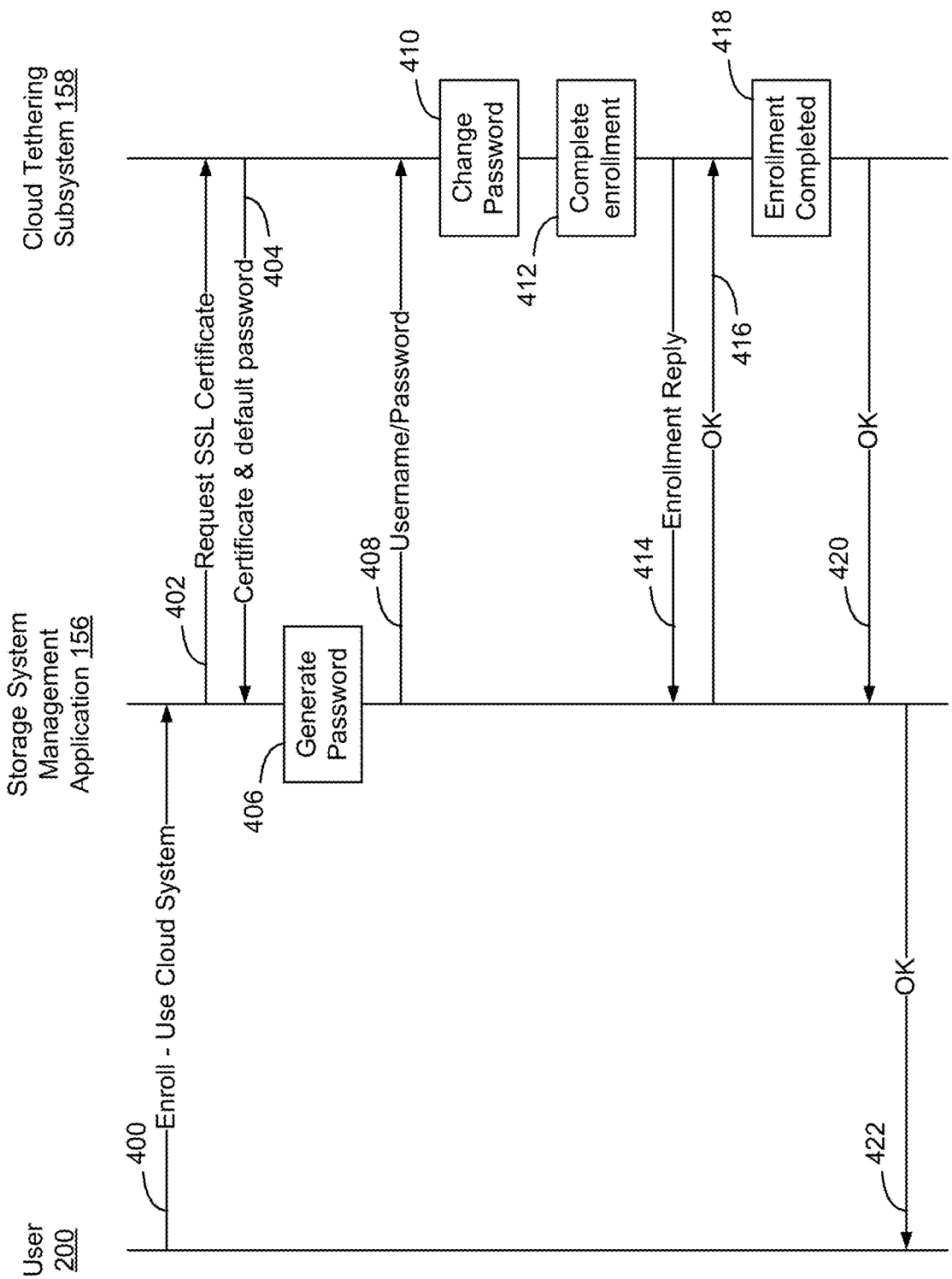
FIG. 4 is a swim lane diagram showing interactions between the user, storage management system, and cloud tethering subsystem, in connection with enrolling a cloud tethering subsystem to a storage management system, according to some embodiments.

In some embodiments, when the user 200 instructs the storage system management application 156 to setup a cloud tethering subsystem 158 (block 305), the storage system management application 156 enrolls an instance of the cloud tethering subsystem (block 310). FIG. 4 is a swim lane diagram showing interactions between the user 200, storage management system 156, and cloud tethering subsystem 158, in connection with enrolling a cloud tethering subsystem to the storage management system, according to some embodiments.

As shown in FIG. 4, the process of enrolling a cloud tethering subsystem begins at arrow 400 with the user instructing the storage system management application to setup cloud access. Arrow 400 of FIG. 4 corresponds to block 305 of FIG. 3.

When storage system management application receives the enroll instruction, the storage system management application requests an SSL certificate from the cloud tethering subsystem 158 (arrow 402). An SSL certificate is a type of digital certificate that provides authentication for a website and enables an encrypted connection, Since in some embodiments communication between storage system management application 156 and cloud tethering subsystem 158 is implemented using REST, the use of a digital certificate such as an SSL certificate enables those communications to be secured within the storage system. When the cloud tethering subsystem 158 receives the certificate request (arrow 402) it responds by providing a copy of its digital certificate and a default password (arrow 404). The default password, at this stage, in some embodiments is "default password" although any phrase can be used as the default password.

When the storage system management application 156 receives the digital certificate, the storage system management application 156 creates a generated password (block 406) and transmits the username and generated password to the cloud tethering subsystem (arrow 408). The cloud tethering subsystem 158 changes the password from the initial default password to the newly generated password (block 410) and completes enrollment of the storage system management application username password combination (block 412). The cloud tethering subsystem 158 responds to the storage system management application 156 that enrollment was successful (arrow 414). In some embodiments, the cloud tethering subsystem 158 does not persist the username/password after the enrollment process ends at arrow 414.

In some embodiments, the storage system management application confirms with the cloud tethering subsystem 158 that enrollment was successful (arrow 416). When the cloud tethering subsystem 158 receives the confirmation request (arrow 416), the cloud tethering subsystem 158 confirms that enrollment for the username and password has been completed (block 418) and responds (arrow 420). Optionally, once the cloud tethering subsystem 158 has been successfully enrolled by the storage system management application 156, the storage system management application 156 may notify the user 200 that this stage has completed successfully (arrow 422).

Returning to FIG. 3, once the storage system management application 156 has successfully enrolled an instance of the cloud tethering subsystem 158 for use with the user 200, the storage system management application needs to register the storage system with the cloud tethering subsystem 158 (block 315), and create a cloud protection environment for use by the cloud tethering subsystem on the storage system 100 (block 320). For convenience the processes associated with block 315 will be described first, followed by the processes associated with block 320. However, these steps (blocks 315 and 320) can happen in either order or simultaneously depending on the implementation.

Figure 5:
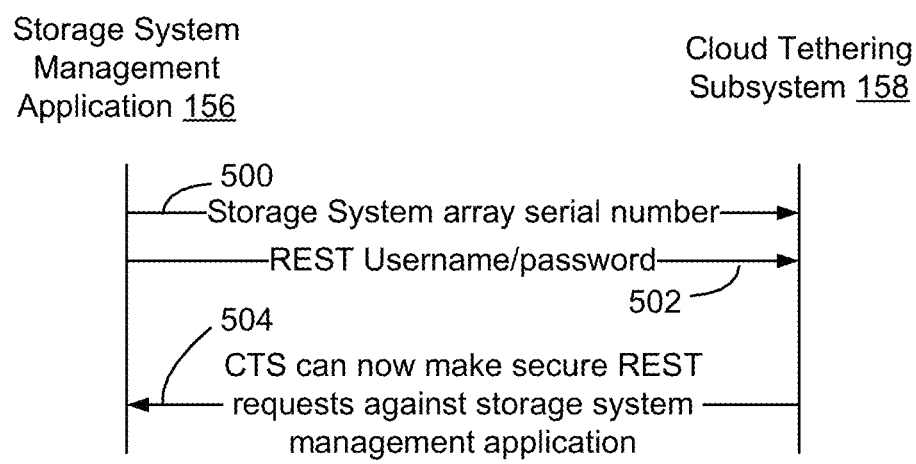
FIG. 5 is a swim lane diagram showing interactions between the storage management system and the cloud tethering subsystem, in connection with registering the storage system with the cloud tethering subsystem, according to some embodiments.

FIG. 5 is a swim lane diagram showing interactions between the storage management system and cloud tethering subsystem, in connection with registering the storage system with the cloud tethering subsystem (FIG. 3, block 315), according to some embodiments. As shown in FIG. 5, once the enrollment is complete, the storage system management application 156 is required to register the storage system array serial number details to the cloud tethering subsystem (arrow 500). In some embodiments, this is done using the cloud tethering subsystem's private REST endpoint 226. In this process, the storage system management 156 application also supplies the cloud tethering subsystem 158 with the username and password required to make secure REST requests against the storage system management application 156 (arrow 502). As shown in FIG. 5, this registration process enables the cloud tethering subsystem 158 to make secure REST requests against the storage system management application 156 (arrow 504).

Figure 6:
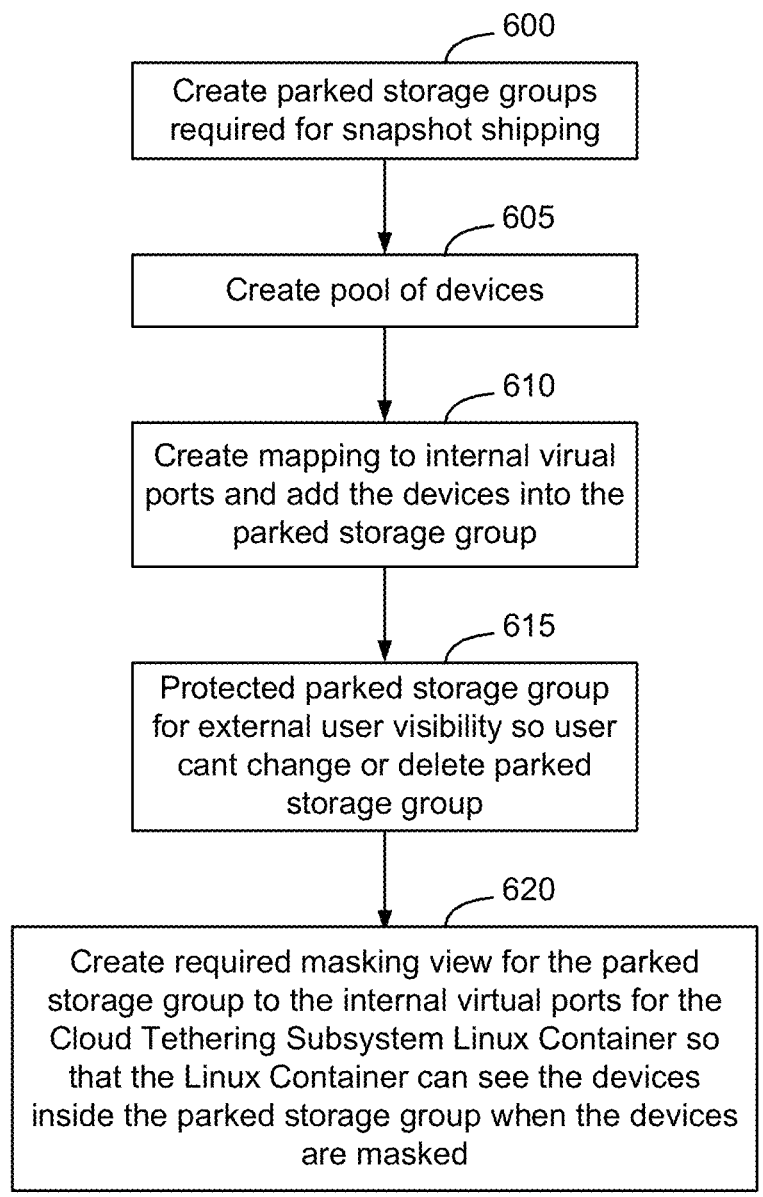
FIG. 6 is a flow chart of an example method of creating a cloud protection environment in the storage system operating system by the storage system management system, according to some embodiments.

In addition to registering the array on the cloud tethering subsystem (FIG. 5) the storage system management application 156 will also need to create a cloud protection environment on the storage system, using the solution enabler (OS-API) 154. FIG. 6 is a flow chart of an example method of creating a cloud protection environment in the storage system operating system by the storage system management system (FIG. 3, block 320), according to some embodiments. The cloud protection environment, in some embodiments, is used by the cloud tethering subsystem 158 to read and write data on the storage system 100. Creation of a cloud protection environment involves a series of API calls to the solution enabler 154, and in response the solution enabler 154 creates the required constructs within the operating system 150 of storage system 100.

As shown in FIG. 6, in some embodiments the process of creating a cloud protection environment includes a step of creating one or more parked storage groups (block 600), that will be used to hold snapshot volumes of data, so that there is at least one storage group that can be used by the cloud tethering subsystem 158 for snapshot shipping purposes. In some embodiments, the storage system 100 uses storage groups to control access to data. A storage group is one or more LUNs within the storage array that can be accessed only by the host or hosts that are associated with the array LUNs. A host cannot access or modify data in any storage system LUNs that are not part of its Storage Group. Accordingly, by instructing the solution enabler to create a storage group for the cloud tethering subsystem 158, the storage system management application creates a set of one or more LUNs that the cloud tethering subsystem 158 can use to retrieve snapshots for shipment to the cloud repository 210, and that the cloud tethering subsystem 158 can use to store snapshots when those snapshots are retrieved back to the storage system from the cloud repository 210.

In addition to creating one or more storage groups, the storage system management application 156 instructs the solution enabler 154 to create one or more thin devices (TDev) that are to be used by the cloud tethering subsystem 158 to access volumes of data stored in the LUNs of the storage group. As noted above, not all volumes of data on the storage system are accessible to a host application, such as cloud tethering subsystem. When a volume of data such as a snapshot is to be accessed by the cloud tethering subsystem 158, a logical storage volume, also referred to herein as a TDev (Thin Device), is linked to the volume of data, and presented to the cloud tethering subsystem 158 as a host device 142. Once the volume of data is linked to a TDev, the cloud tethering subsystem can execute read/write IOs on the TDev to access the data of the snapshot copy, for example to ship the snapshot to the cloud repository. In some embodiments the storage system management application instructs the solution enabler 154 to create four thin devices for use by the cloud tethering subsystem, although other embodiments may create other numbers of thin devices.

As shown in FIG. 6, in addition to creating the pool of devices, in some embodiments the storage system management application 156 instructs the solution enabler 154 to create a mapping to internal virtual ports and adds the devices into the parked storage group (block 610).

In some embodiments, the storage group is only used by the cloud tethering subsystem 158 and is not used by any other system application. Accordingly, to prevent the user 200 from changing or deleting the storage group, in some embodiments the storage group is protected by causing the storage group to not be visible to the user 200 (block 615). For example, since this storage group is a system entity required only for use by the cloud tethering subsystem 158, protecting the parked storage group by preventing external user visibility to the storage group prevents a user 200 from accidentally modifying or deleting the storage group. If the storage group were to be deleted or modified, the cloud tethering subsystem 158 could lose the ability to read or write to the LUNs of the storage group, which would cause shipment of snapshots to or from the cloud repository 210 to fail.

As shown in FIG. 6, the storage system management application 156 also instructs the solution enabler 154 to create the required masking view for the parked storage group to the internal virtual ports for the cloud tethering subsystem Linux container, so that the cloud tethering subsystem's Linux container can see the devices inside the parked storage group when the devices are masked (block 620). At this stage, the cloud protection environment has been created which enables the cloud tethering subsystem to read and write to the thin devices that are able to be linked to storage volumes within the storage group. Optionally, the user 200 may be notified at this stage that the cloud tethering subsystem has been installed on the storage system 100 and is ready to be used.

To enable the cloud tethering subsystem 158 to communicate with cloud repository 210, in some embodiments one or more external network interfaces are created on the cloud tethering subsystem 158 (FIG. 3 block 325). Creation of external network interfaces might require user input. Example user input might include an IP address, DNS information, and gateway information, although other information might be required depending on the implementation.

Figure 7:
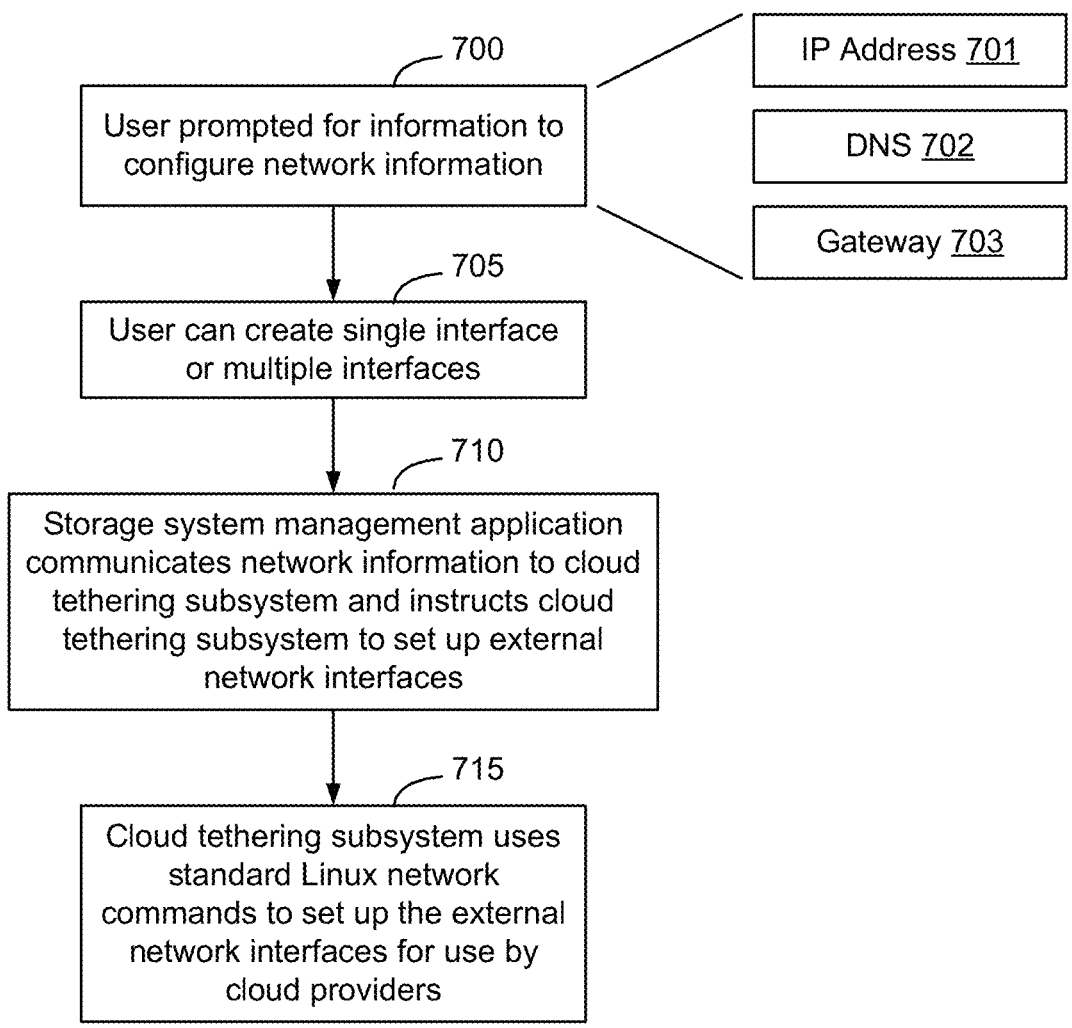
FIG. 7 is a flow chart of an example method of creating external network interfaces on the cloud tethering subsystem by the storage system management system, according to some embodiments.

FIG. 7 is a flow chart of an example method of creating external network interfaces on the cloud tethering subsystem by the storage system management system (FIG. 3 block 325), according to some embodiments. As shown in FIG. 7, in some embodiments the user is prompted for information to configure the external network interfaces on the cloud tethering subsystem 158 (block 700). Example network information might include IP (Internet Protocol) addresses 701, DNS (Domain Name Service) information 702, and gateway information 703. Although FIG. 3 shows this input as being provided by the user at block 325, this information may be collected by the storage system management application at any earlier stage of the process. For example, when the user instructs the storage system to setup cloud tethering in block 305, the user could also be prompted at that stage for information relative to external network configuration (FIG. 7, block 700). Accordingly, the particular manner in which the information is collected by the storage system management application at block 700 might vary depending on the implementation.

As shown in FIG. 7, the user can create a single external network interface or might create multiple interfaces, for example to implement NIC teaming (block 705). Once the required information has been received by the storage system management application 156, the storage system management application communicates the network information to the cloud tethering subsystem 158 to instruct the cloud tethering subsystem 158 to setup network interfaces (block 710). In some embodiments, for example as shown in FIG. 2, the storage system management application implements the network interface setup command using a REST command that is communicated to the cloud tethering subsystem's private REST endpoint 226. The cloud tethering subsystem uses standard Linux network commands to set up the external network interfaces for use by cloud providers implementing cloud repository 210.

In addition to creating the external network interfaces, it is also necessary to set up one or more cloud providers on the cloud tethering subsystem 158. Example cloud providers include ECS (Elastic Cloud Storage), Amazon S3, Google Cloud, and Microsoft Azure, although any number of cloud providers might be used.

Figure 8:
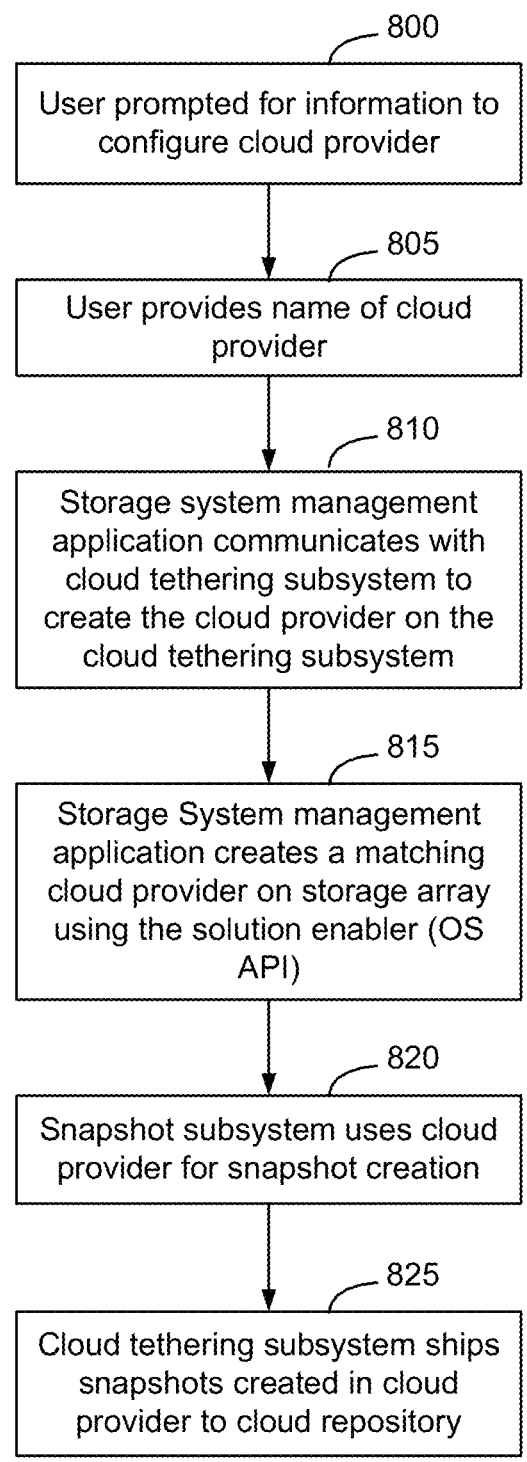
FIG. 8 is a flow chart of an example method of configuring public or private cloud provider endpoints, by the storage system management system, according to some embodiments.

FIG. 8 is a flow chart of an example method of configuring public or private cloud provider endpoints, by the storage system management system (FIG. 3, block 330), according to some embodiments. As shown in FIG. 8, in some embodiments the user is prompted for information to configure a cloud provider (block 800). For example, the user may be asked for and may provide a name of a cloud provider (block 805). Although this user input is shown as coming at the end of the process shown in FIG. 3, it can occur at any stage, including at block 305 of the process. Likewise, additional cloud providers can be added to a cloud tethering subsystem 158 at any point after creation of the cloud tethering subsystem 158, and a given cloud tethering subsystem may link to multiple cloud providers.

As shown in FIG. 8, once the user provides the name of the cloud provider, the storage system management application 156 communicates with the cloud tethering subsystem 158 to create the cloud provider on the cloud tethering subsystem 158 (block 810). The storage system management application 156 instructs the solution enabler (OS-API) 154 to create a matching cloud provider within the storage group associated with the cloud tethering subsystem 158 on the storage system (block 815). When snapshots are created by the snapshot subsystem 160, they are stored in the storage group and associated with the cloud provider (block 820). The cloud tethering subsystem 825 then executes to ship the snapshots created in the cloud provider to the cloud repository 210 (block 825).

FIGS. 9-14 are functional block diagrams of an example user interface configured to guide a user through a process of setting up a containerized cloud communication system within an embedded operating system.

Figure 9:
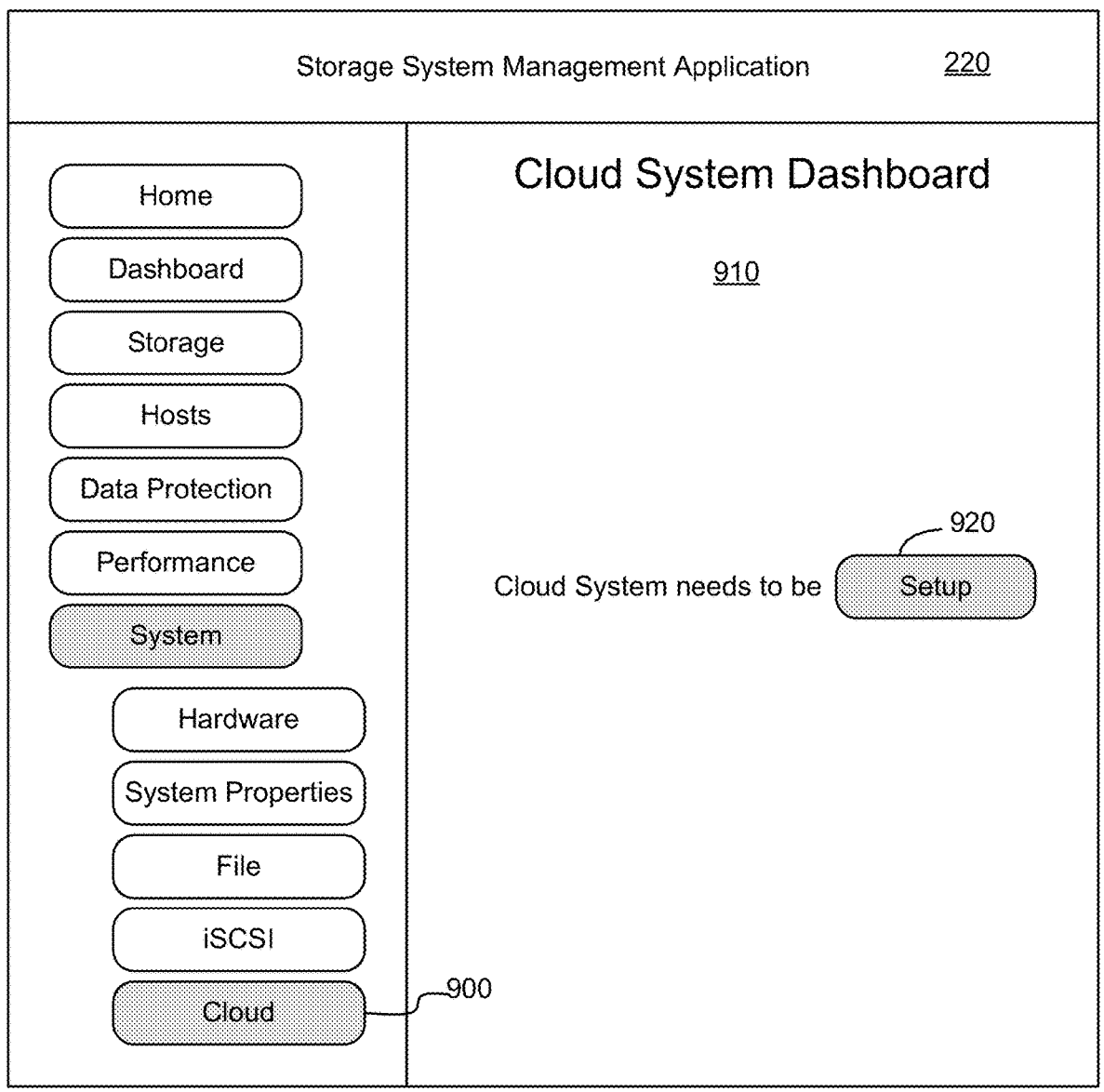
FIGS. 9-14 are functional block diagrams of an example user interface configured to guide a user through a process of setting up a containerized cloud communication system within an embedded operating system.

As shown in FIG. 9, if the user would like to access cloud resources, and access to cloud resources have not previously been configured on the storage shstey, the user can start the cloud setup process by selecting the cloud tab 900. Selection of cloud tab 900 causes the cloud system dashboard 910 to be displayed on the storage system management application user interface 220. Since cloud resources have not previously been set up on the storage system, as shown in FIG. 9 the user is prompted to start the process by clicking a "setup" button 920. Clicking "setup" button 920 corresponds to the user input at block 305 of FIG. 3. When the user clicks the setup button 920, the storage system management application proceeds to implement the processes described above in connection with blocks 310, 325, and 320 of FIG. 3. No further input is required from the user while the storage system management application implements all the required interconnections between the cloud tethering subsystem and embedded operating system.

Figure 10:
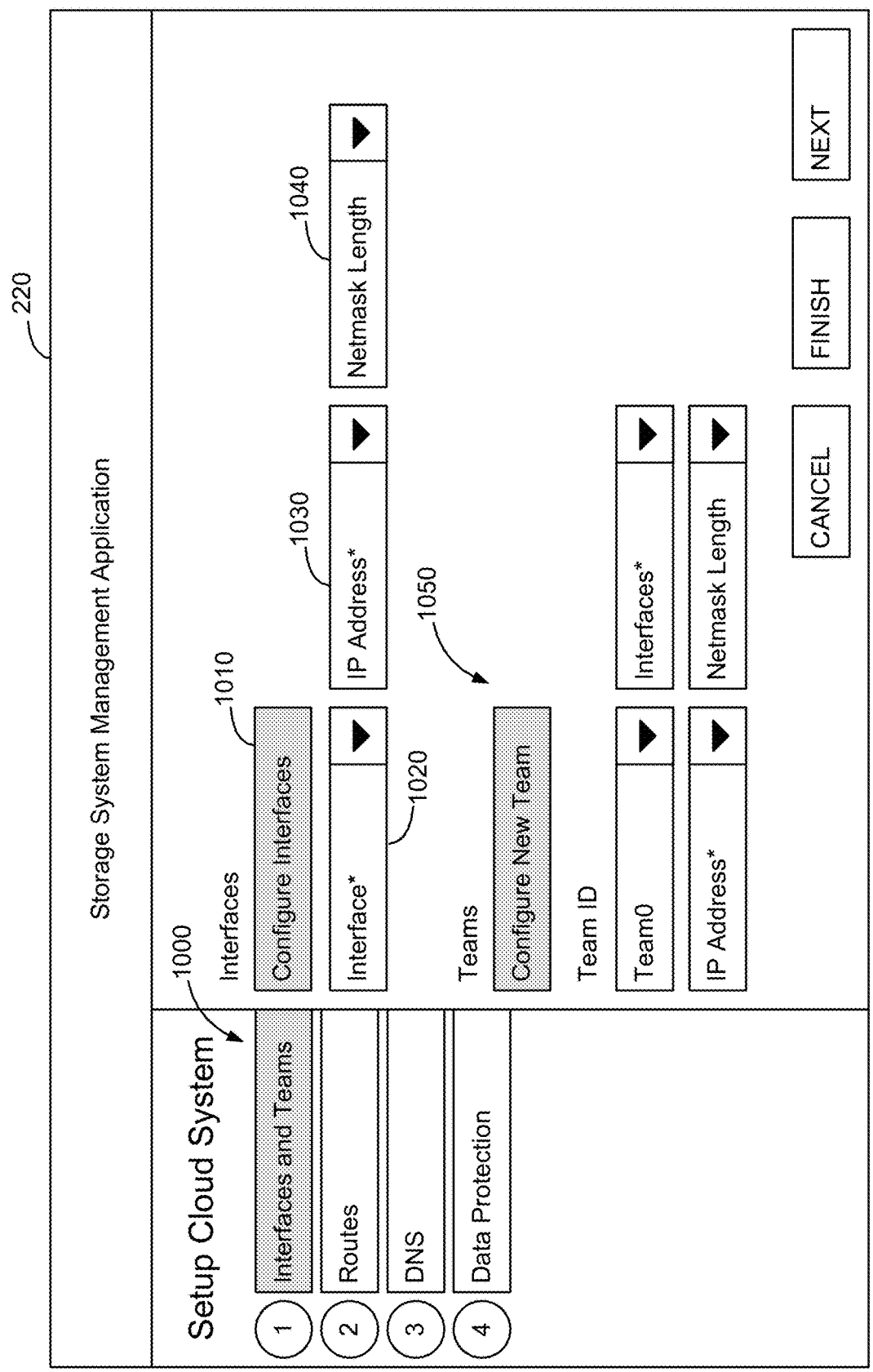
Figure 11:
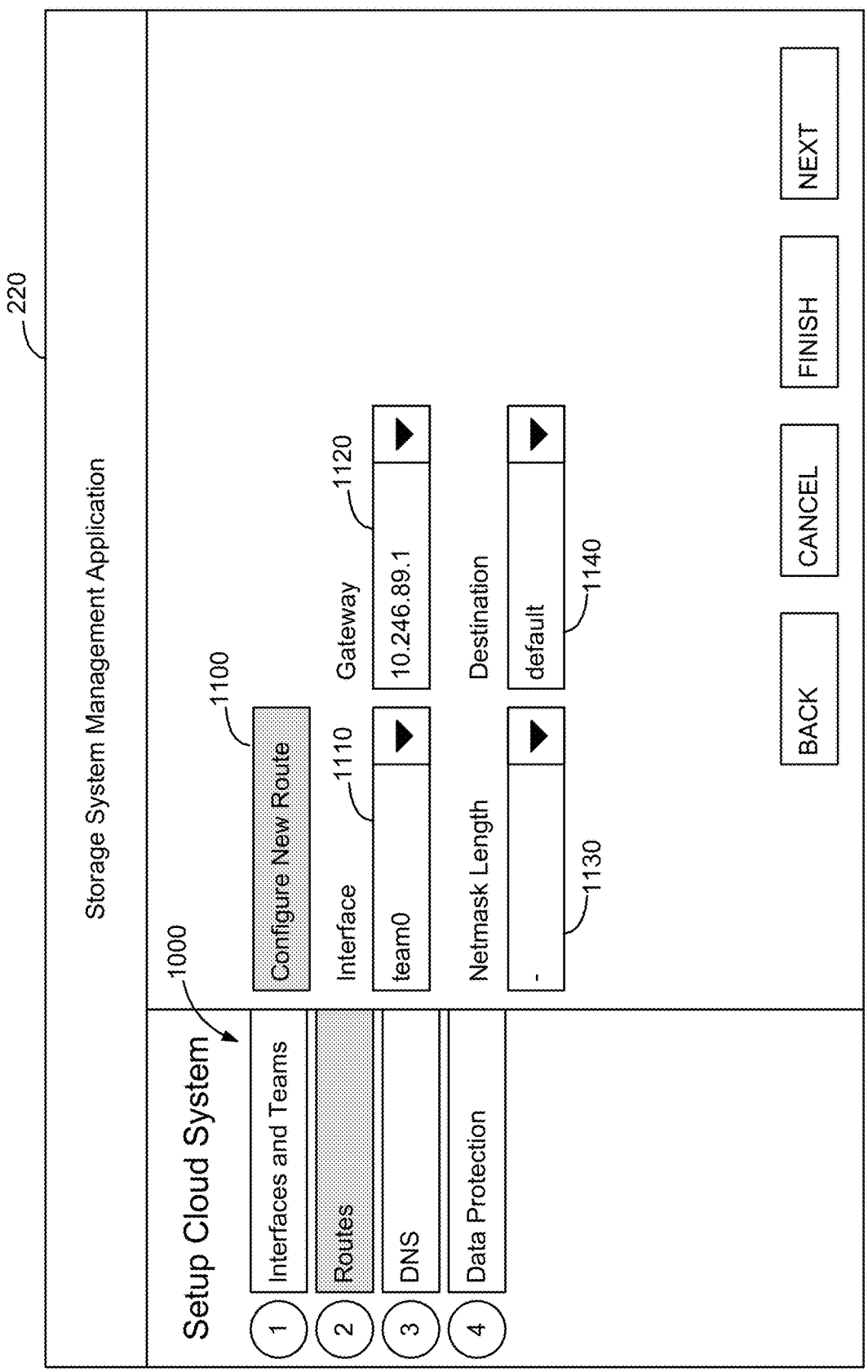
Figure 12:
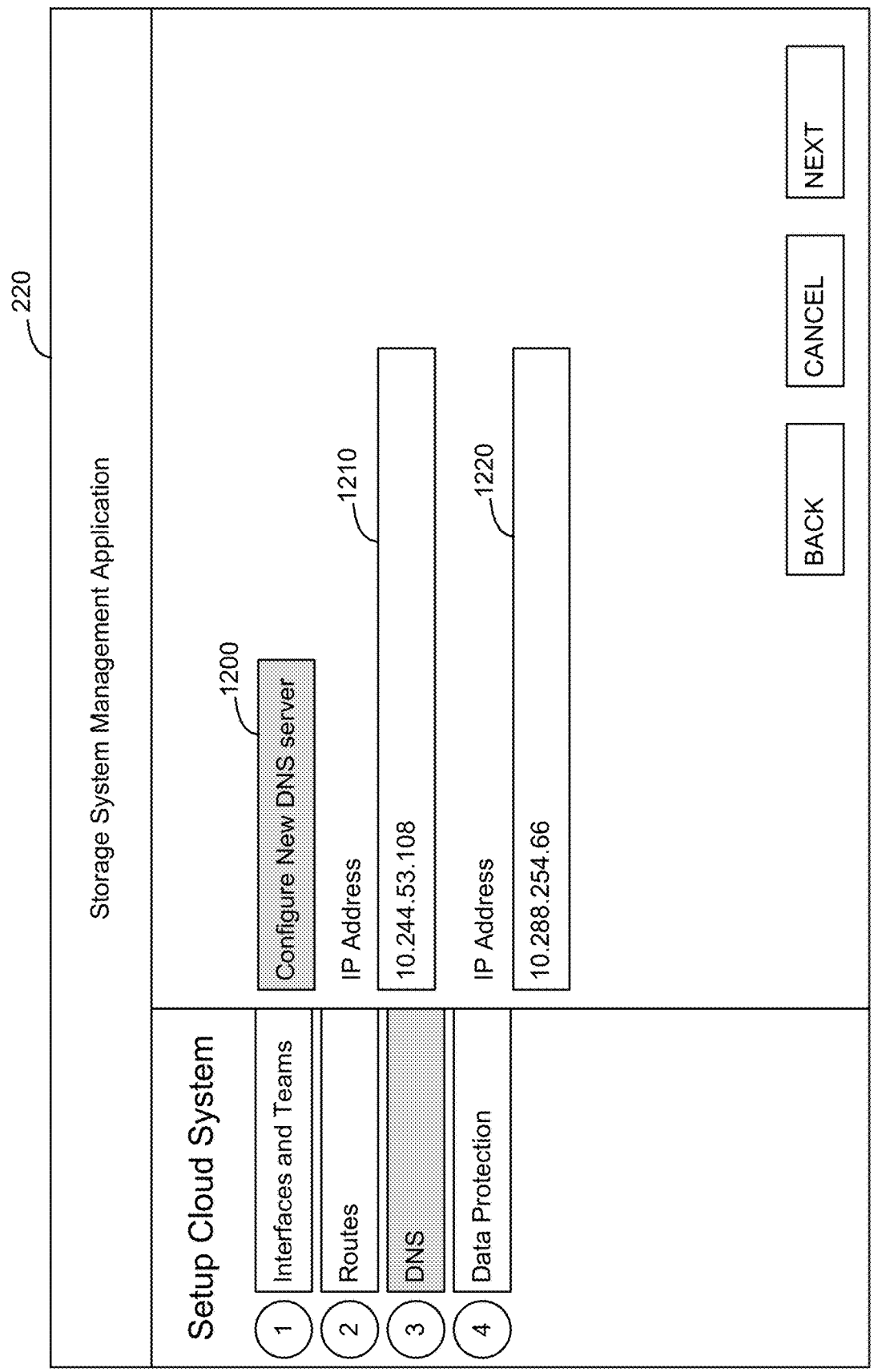

The user interface then continues to guide the user through the cloud setup process by providing the user with a series of screens that are used to collect information about the network interfaces that are to be created. For example, as shown in FIG. 10-12, in some embodiments the user is guided through a process of inputting (1) interfaces and interface team information; (2) route information; and (3) DNS information. As the user progresses through the series of screens used to collect network information, the stage of the process is identified by highlighting the stage indicator 1000 on the left-hand side of the user interface.

FIG. 10 corresponds to the first stage of the network information collection process, and accordingly stage indicator #1 is highlighted. In this stage the user is prompted to provide information about the interfaces 1010 and interface teams 1050 that are to be created. For example, the user may use field 1020 to select an interface, input the IP address for the interface in field 1030, and input the netmask length in field 1040. The user is also presented with a similar set of fields 1050 that can be used to create teams of interfaces.

FIG. 11 corresponds to the second stage of the network information collection process, and accordingly stage indicator #2 is highlighted. In this stage the user is prompted to provide information about routes 1100 that should be used. In the illustrated example, this GUI screen has a field 1110 that is used to select an interface, a field 1120 that is used to enter the gateway IP address, a field 1130 that is used to enter the netmask length, and a field 1140 that is used to identify the destination.

FIG. 12 corresponds to the third stage of the network information collection process, and accordingly stage indicator #3 is highlighted. In this stage the user is prompted to provide DNS information 1200. In the illustrated example, this GUI screen has a field 1210 that is used to input a first IP address of the DNS server, and a field 1220 that is used to input a second IP address of the DNS server.

Once the user has entered the required network information, the storage system management application causes creation of the network interfaces on the cloud tethering subsystem 158, as described above in connection with FIG. 3, block 325, and FIG. 7.

The last step in the guided process of setting up cloud access involves creation of one or more cloud providers. Whenever access to cloud services is desired, it is necessary to create a "cloud provider" to act as an object repository in the cloud repository 210 and register the cloud provider in the cloud tethering subsystem 158 and in the storage system's embedded operating system 150. The term "cloud provider" is used herein to refer to a specific instance of cloud storage. Multiple "cloud providers" can therefore be created within a given cloud repository. For example, a user may have multiple storage groups created on the storage system 100, and want snapshots of the different storage groups to be stored separately in cloud storage. Accordingly, the user could create a separate cloud provider for each of the storage groups, and then cause the cloud tethering subsystem 158 to ship the snapshots of the different storage groups to the different cloud providers. In some embodiments, the cloud tethering subsystem is agnostic as to which repository is used to implement a given cloud provider, such that all cloud providers may be configured within the same cloud repository 210 (e.g. all cloud providers could be configured within Amazon S3) or various cloud providers could be configured in different cloud repositories (e.g. some cloud providers could be created at Amazon S3 and some cloud providers could be created at Azure).

Figure 13:
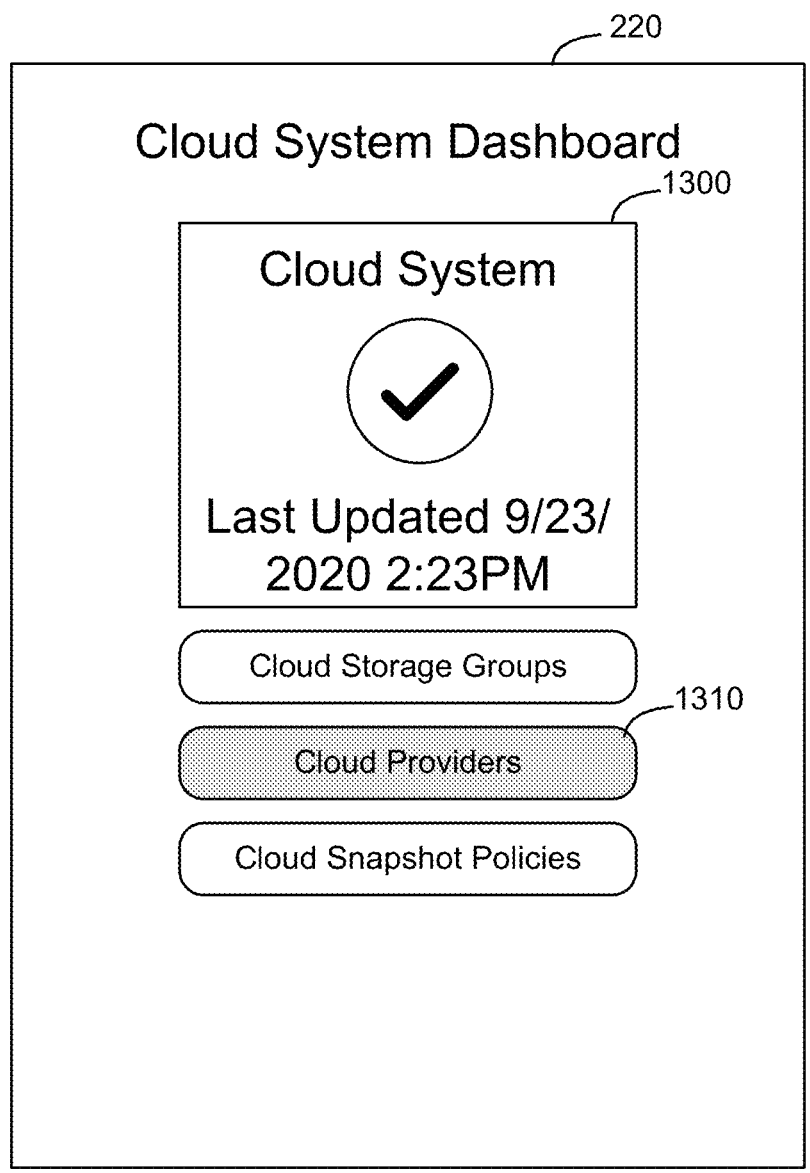

FIG. 13 shows an example view of the cloud system dashboard of the storage system management application GUI 220 after the user has been guided through the preceding screens. As shown in FIG. 13, in some embodiments the cloud system dashboard contains a status indicator 1300 indicating that the cloud system has been successfully created on the storage system. The cloud system dashboard also includes a button 1310 which, if selected, causes the user interface to transition to the view shown in FIG. 14, which the user can use to manage and create cloud providers on the storage system 100.

Figure 14:
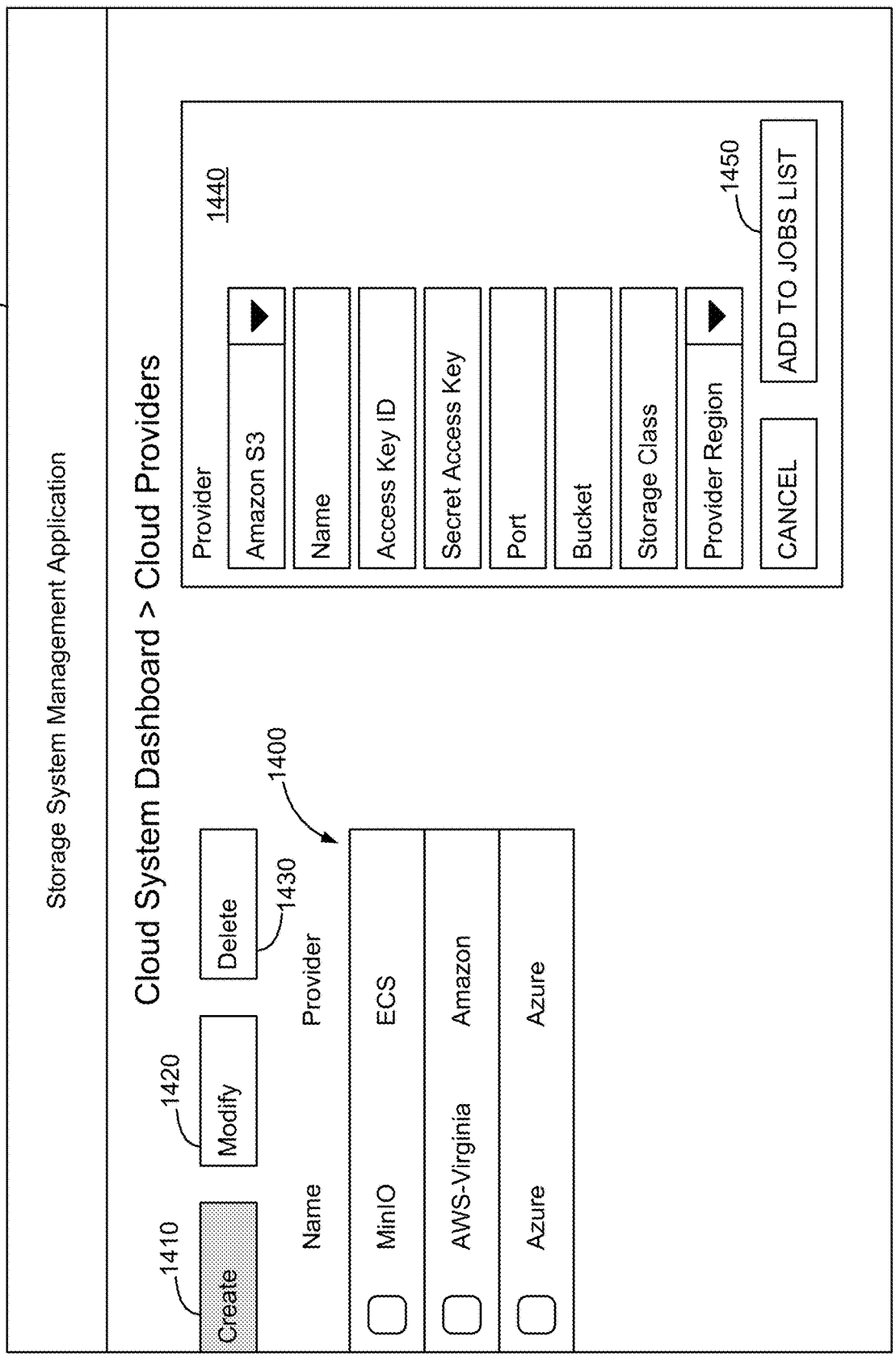

As shown in FIG. 14, if the user selects button 1310, the cloud system dashboard displays a list of existing cloud providers 1400 and buttons 1410, 1420, 1430 that the user may used to create a new cloud provider, modify an existing cloud provider, or delete an existing cloud provider.

If the user selects the create button 1410, an overlay 1440 is generated which has multiple fields that are used to enter information about the type of cloud provider that should be created. In some embodiments, not all of these fields are required to be completed to request creation of a cloud provider. Once the required information has been supplied, the user can use button 1450 to submit the cloud provider job for execution on the storage system management application.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program, the computer program including a set of instructions which, when executed by a computer, cause the computer to perform a method comprising the steps of:

receiving, by a storage system management application, a request to initiate movement of volumes of data from storage resources of a storage system to storage resources of a cloud repository; and in response to the request, orchestrating setup of a containerized cloud communication system, by the storage system management application, within an embedded operating system of the storage system, the containerized cloud communication system being configured to implement movement of the volumes of data from the storage resources of the storage system to the storage resources of the cloud repository;

wherein the step of orchestrating setup of the containerized cloud communication system within the embedded operating system of the storage system comprises:

causing an instance of the cloud communication system to be started in a container on the embedded operating system of the storage system, the instance of the cloud communication system being configured to transmit the volumes of data from the storage resources of the storage system to the storage resources of the cloud repository;

enrolling the instance of the cloud communication system to the storage system management application;

registering the storage system, by the storage system management application, on the instance of the cloud communication system;

creating a cloud protection environment, by the storage system management application, in the embedded operating system of the storage system via an API layer to the embedded operating system;

creating at least one external network interface, by the storage system management application, on the instance of the cloud communication system, the at least one external network interface being configured to enable the instance of the cloud communication system to communicate with the cloud repository; and configuring a public or private cloud provider, by the storage system management application, on the instance of the cloud communication system, the cloud provider being a specific instance of cloud storage within the cloud repository configured to act as an object repository in the cloud repository;

wherein the steps of causing the instance of the cloud communication system to be started in the container on the embedded operating system of the storage system, enrolling the instance of the cloud communication system to the storage system management application, registering the storage system on the instance of the cloud communication system, and creating the cloud protection environment in the embedded operating system, require no user input after receipt of the request to initiate movement of the volumes of data from the storage resources of the storage system to the storage resources of the cloud repository; and after orchestrating setup of the containerized cloud communication system within the embedded operating system of the storage system:
- linking a Thin Device (TDev) to a first of the volumes of data;
- presenting the thin device in the container as a host device;
- issuing read operations by the instance of the cloud communication system on the host device to access data of the first of the volumes of data; and
- sending the data of the first of the volumes of data to the cloud provider on the at least one external network interface.

2. The non-transitory tangible computer readable storage medium of claim 1, wherein the step of enrolling the instance of the cloud communication system comprises sending a first request for a digital certificate from the storage system management application to the cloud tethering subsystem.

3. The non-transitory tangible computer readable storage medium of claim 2, further comprising providing a first response containing the digital certificate and a default password by the instance of the cloud communication system to the storage system management application in response to the first request.

4. The non-transitory tangible computer readable storage medium of claim 3, further comprising generating a password by the storage system management application, and forwarding the generated password to the instance of the cloud communication system.

5. The non-transitory tangible computer readable storage medium of claim 4, further comprising using the generated password to complete the step of enrolling the instance of the cloud communication system to the storage system management application.

6. The non-transitory tangible computer readable storage medium of claim 1, wherein the step of registering the storage system on the instance of the cloud communication system comprises transmitting a storage system serial number and username/password from the storage system management application to the instance of the cloud communication system.

7. The non-transitory tangible computer readable storage medium of claim 1, wherein the step of creating the cloud protection environment comprises creation of a storage group in the embedded operating system.

8. The non-transitory tangible computer readable storage medium of claim 7, wherein the storage group comprises one or more LUNs.

9. The non-transitory tangible computer readable storage medium of claim 8, further comprising creating a pool of Thin Devices (TDevs) to be used to read and write data to the LUNs.

10. The non-transitory tangible computer readable storage medium of claim 9, further comprising creating a mapping to internal virtual ports and adding the devices into the storage group.

11. The non-transitory tangible computer readable storage medium of claim 10, further comprising creating a masking view for the storage group to the internal virtual ports for the instance of the cloud communication system to enable the instance of the cloud communication system to see the TDevs inside the storage group.

12. The non-transitory tangible computer readable storage medium of claim 1, wherein the step of creating the at least one external network interface comprises receiving user input related to IP address information, DNS information, and gateway information to be used to create the external network interfaces on the instance of the cloud communication system.

13. A method, comprising the steps of:
receiving, by a storage system management application, a request to initiate movement of volumes of data from storage resources of a storage system to storage resources of a cloud repository; and in response to the request, orchestrating setup of a containerized cloud communication system, by the storage system management application, within an embedded operating system of the storage system, the containerized cloud communication system being configured to implement movement of the volumes of data from the storage resources of the storage system to the storage resources of the cloud repository;

wherein the step of orchestrating setup of the containerized cloud communication system within the embedded operating system of the storage system comprises:
- causing an instance of the cloud communication system to be started in a container on the embedded operating system of the storage system, the instance of the cloud communication system being configured to transmit the volumes of data from the storage resources of the storage system to the storage resources of the cloud repository;
- enrolling the instance of the cloud communication system to the storage system management application;
- registering the storage system, by the storage system management application, on the instance of the cloud communication system;
- creating a cloud protection environment, by the storage system management application, in the embedded operating system of the storage system via an API layer to the embedded operating system;
- creating at least one external network interface, by the storage system management application, on the instance of the cloud communication system, the at least one external network interface being configured to enable the instance of the cloud communication system to communicate with the cloud repository; and
- configuring a public or private cloud provider endpoint, by the storage system management application, on the instance of the cloud communication system, the cloud provider being a specific instance of cloud storage within the cloud repository configured to to act as an object repository in the cloud repository;

wherein the steps of causing the instance of the cloud communication system to be started in the container on the embedded operating system of the storage system, enrolling the instance of the cloud communication system to the storage system management application, registering the storage system on the instance of the cloud communication system, and creating the cloud protection environment in the embedded operating system, require no user input after receipt of the request to initiate movement of the volumes of data from the storage resources of the storage system to the storage resources of the cloud repository; and after orchestrating setup of the containerized cloud communication system within the embedded operating system of the storage system:
  linking a Thin Device (TDev) to a first of the volumes of data;
  presenting the thin device in the container as a host device;
  issuing read operations by the instance of the cloud communication system on the host device to access data of the first of the volumes of data; and
  sending the data of the first of the volumes of data to the cloud provider on the at least one external network interface.

14. The method of claim 13:
wherein the step of enrolling the instance of the cloud communication system comprises sending a first request for a digital certificate from the storage system management application to the instance of the cloud communication system; and
the method further comprising the steps of:
  providing a first response containing the digital certificate and a default password by the instance of the cloud communication system to the storage system management application in response to the first request;
  generating a password by the storage system management application, and forwarding the generated password to the instance of the cloud communication system; and
  using the generated password to complete the step of enrolling the instance of the cloud communication system to the storage system management application.

15. The method of claim 13, wherein the step of registering the storage system on the instance of the cloud communication system comprises transmitting a storage system serial number and username/password from the storage system management application to the instance of the cloud communication system.

16. The method of claim 13:
wherein the step of creating the cloud protection environment comprises creation of a storage group in the embedded operating system; and
wherein the storage group comprises one or more LUNs.

17. The method of claim 16, further comprising:
creating a pool of devices to be used to read and write data to the LUNs;
creating a mapping to internal virtual ports and adding the devices into the storage group; and
creating a masking view for the storage group to the internal virtual ports for the instance of the cloud communication system to enable the instance of the cloud communication system to see the devices inside the storage group.

18. The method of claim 13, wherein the step of creating the at least one external network interface comprises receiving user input related to IP address information, DNS information, and gateway information to be used to create the external network interfaces on the instance of the cloud communication system.

19. The method of claim 13, wherein the volumes of data are a point in time snapshots of filesystems.

* * * * *